United States Patent
Shaffer et al.

(10) Patent No.: US 6,567,507 B1
(45) Date of Patent: May 20, 2003

(54) SYSTEM AND METHOD FOR AUTOMATED RETURN TO MESSAGING MAILBOX

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/085,138

(22) Filed: May 26, 1998

(51) Int. Cl.[7] .................................................. H04M 1/64
(52) U.S. Cl. .............................. 379/88.19; 379/210.01
(58) Field of Search ........................... 379/88.22, 88.23, 379/88.25, 88.27, 88.28, 265, 266, 265.07, 266.01, 266.1, 88.19–88.21, 210.01

(56) References Cited

U.S. PATENT DOCUMENTS

| | | | |
|---|---|---|---|
| 4,585,906 A | | 4/1986 | Matthews et al. |
| 4,926,462 A | | 5/1990 | Ladd et al. |
| 5,175,761 A | * | 12/1992 | Khalid et al. ............. 379/88.22 |
| 5,181,236 A | * | 1/1993 | LaVallee et al. ......... 379/88.22 |
| 5,233,655 A | | 8/1993 | Shapiro |
| 5,588,037 A | | 12/1996 | Fuller et al. |
| 5,592,473 A | | 1/1997 | Matern et al. |
| 5,625,675 A | | 4/1997 | Katsummaru et al. |
| 5,675,631 A | | 10/1997 | Kaminsky et al. |
| 5,793,861 A | * | 8/1998 | Haigh .......................... 257/693 |
| 5,903,642 A | * | 5/1999 | Schwartz et al. ............ 379/309 |
| 5,912,951 A | * | 6/1999 | Checchio et al. ......... 379/88.22 |
| 5,943,397 A | * | 8/1999 | Gabin et al. ................. 379/67.1 |
| 5,943,409 A | * | 8/1999 | Malik ..................... 379/209.01 |
| 6,195,418 B1 | * | 2/2001 | Ridgley .................... 379/88.23 |
| 6,393,108 B1 | * | 5/2002 | McElwee ................. 379/88.19 |

* cited by examiner

*Primary Examiner*—Scott L. Weaver
*Assistant Examiner*—R G F

(57) ABSTRACT

A messaging system (10) includes a voice mail system (VMS) (20) in communication with a telecommunications switch (22). The VMS (20) includes a call processor (28) and a message mailbox (30). The mailbox (30) includes a message queue (32) and a pointer (34). The call processor (28) is capable of transferring a user call and generating a re-call protocol element in response by transfer request received during message playback. The telecommunications switch (22) can reconnect the transferred call after termination thereof to the call processor (28) according to the re-call protocol element. The reconnected call accesses the voice message stored at a return position indicated by the pointer. The call transfer feature can also be used with shared mailboxes.

27 Claims, 5 Drawing Sheets

SYSTEM AND METHOD FOR AUTOMATED RETURN TO MESSAGING MAILBOX

FIELD OF THE INVENTION

The present invention generally relates to voice mail systems, and in particular, to a messaging system that automatically permits a user to return to a predetermined position in a message queue.

BACKGROUND OF THE INVENTION

"Voice mail" is a common feature in many telecommunication systems. In a conventional telecommunication system, the voice mail feature is provided by a voice mail system (VMS), which is a computerized device for automatically storing audio messages left by callers, for later retrieval by VMS users. Typically, the VMS includes a multitude of "voice mailboxes", each storing messages for a particular user. A mailbox is a essentially a designated area of memory that is writable by any caller, but readable only by the owner of the mailbox. This arrangement permits a degree of privacy for users by limiting access to individual mailboxes. Messages are stored in a mailbox in the order they are received, creating a message queue. Typically, messages are played back in last-in-first-out (LIFO) fashion; thus, the most recently left message is the first heard during playback. Many prior art voicemail systems permit users to skip over messages by entering specific touch tone keystrokes during playback.

A user can access his/her stored messages any time by placing a telephone call to the VMS and then providing specific user information, such as a mailbox identifier (ID) and a mailbox password. Typically, the mailbox ID corresponds to the user's telephone number and is used by the VMS for both storing and retrieving messages. The mailbox password, however, is the key to accessing messages stored in the mailbox, and is generally held in confidence and known only to the user.

In contrast to the individual mailbox, some voice mail systems also include "shared" mailboxes, which allow multiple users to access messages stored in a single mailbox. Shared mailboxes are useful in settings such as sales offices, where a number of sales people are responsible for responding to a common pool of incoming calls. To support shared mailboxes, a VMS typically includes a mechanism for mapping multiple user phone numbers to a single mailbox ID. The users of shared mailboxes are provided with the common mailbox ID and a common password.

A known feature of many voice mail systems is the ability of users to transfer out of the voice mail system while listening to messages. To transfer out of the VMS, a user typically inputs a predetermined command, such as one or more keystrokes from a touch tone phone or hang up. In response to the user command, the VMS causes the user to disconnect from the VMS and then connect to another terminal device, such as the telephone of another party.

Unfortunately, once a user disconnects from the VMS, his/her place in the message queue of the VMS is lost. Consequently, when a user transfers out of the VMS and then wishes to return, it is not only necessary for him to repeat the task of logging onto the VMS, but it is also necessary for him to manually skip through messages in order to return to the place in the queue where he/she left off. To complete this task, it generally requires many keystrokes and a degree of patience.

Therefore, there is a need for a messaging system that frees users from the tedious task of returning to their voice mailbox after performing a routine transfer to another terminal device.

SUMMARY OF THE INVENTION

It is an advantage of the present invention to overcome the limitations of prior art voice mail systems. It is also an advantage of the present invention to provide a system and method that permits users to automatically return to a predetermined position in a voice mail message queue without having to repeat the task of logging into the VMS and bypass previously heard messages.

According to one aspect of the present invention, a messaging system includes a call processor and a message mailbox for storing a sequence of voice messages in a queue. A pointer is used to indicate a return position in the message queue. In response to a user request during message playback, the call processor transfers the user's call to another terminal device and generates a re-call protocol element. A telecommunications switch, which is responsive to the re-call protocol element, connects the call to the terminal device. After the transferred call has terminated, the switch reconnects the transferred call to the VMS. The re-call protocol element is used to identify the re-connected call as a returned call. Upon identifying the returned call, the call processor automatically reconnects the call to the voice message stored at the return position indicated by the pointer. This arrangement enables a user to forego inconvenience of having to re-log into the messaging system and manually skip previously heard messages.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE INVENTION

Figure 1:
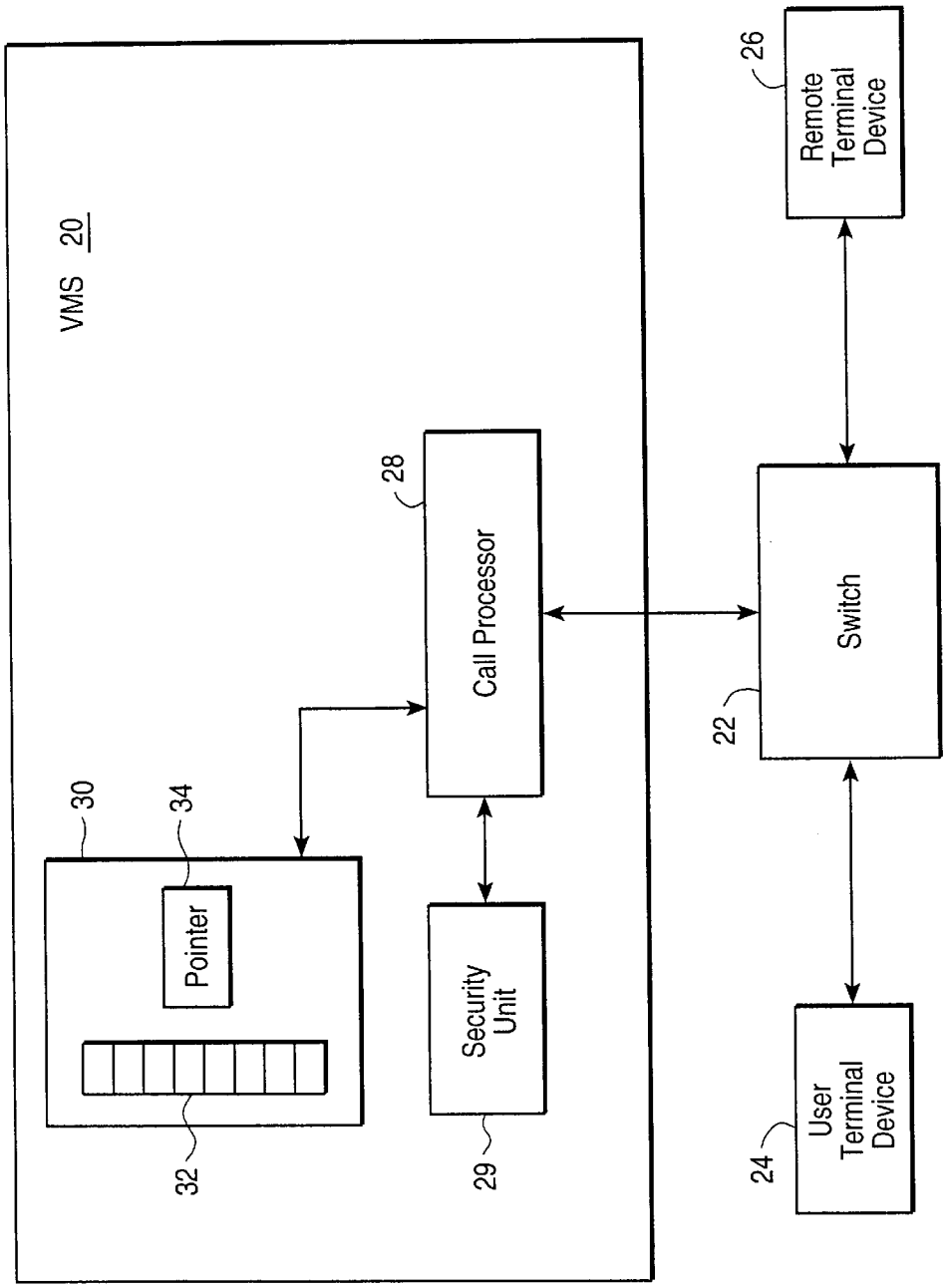
FIG. 1 illustrates a block diagram of a messaging system in accordance with one embodiment of the present invention.

Referring now to the drawings, and particularly to FIG. 1, there is illustrated a system 10 that permits a transferred to call to automatically return to a predetermined position in a message queue. The system 10 includes a voice mail system (VMS) 20 and a telecommunication switch 22. The VMS 20 includes a call processor 28, a security unit 29, and a mailbox 30. Within the mailbox 30, there is a message queue 32 and a pointer 34. Attached to the telecommunication switch 22 is a user terminal device 24 and a remote terminal device 26. The user terminal device 24 and the remote terminal device 26 can be embodied as any of a variety of devices for communicating messages over a conventional telecommunication network, such as telephones, pagers, facsimile machines, etc.

Although FIG. 1 depicts the VMS 20 having only one mailbox 30, it will be apparent to one of ordinary skill that the VMS 20 can include any number of mailboxes. Furthermore, it will also be readily apparent to one of ordinary skill that any number of terminal devices can be included in the system 10.

The call processor 28 interfaces with the switch 22 and controls user access to the mailbox 30. To access the mailbox 30, a user places a call from the terminal device 24, which is routed by the switch 22 to the VMS 20. Before permitting access to the mailbox 30, the call processor 28 verifies the user's mailbox ID and password. This is accomplished by comparing the caller mailbox ID and password with a stored mailbox ID and password. Upon successful comparison, the call processor 28 can begin playback of messages stored in the message queue 32.

The message queue 32 is a memory device for storing voice messages. The voice messages can be stored in the order they are received; while the pointer 34 can indicate the position in the queue 32 of the message currently accessed by the user. The pointer 34 can be updated to indicate the next message in the queue when a message is finished playing, or when the user transfers out of the VMS 20 during message playback.

The pointer 34 can be a data variable that can be manipulated by a software routine included in the call processor 28. For example, the pointer 34 can be an index value that may be incremented or decremented by the routine to indicate different memory addresses corresponding to different messages stored in the queue 32.

Figure 4:
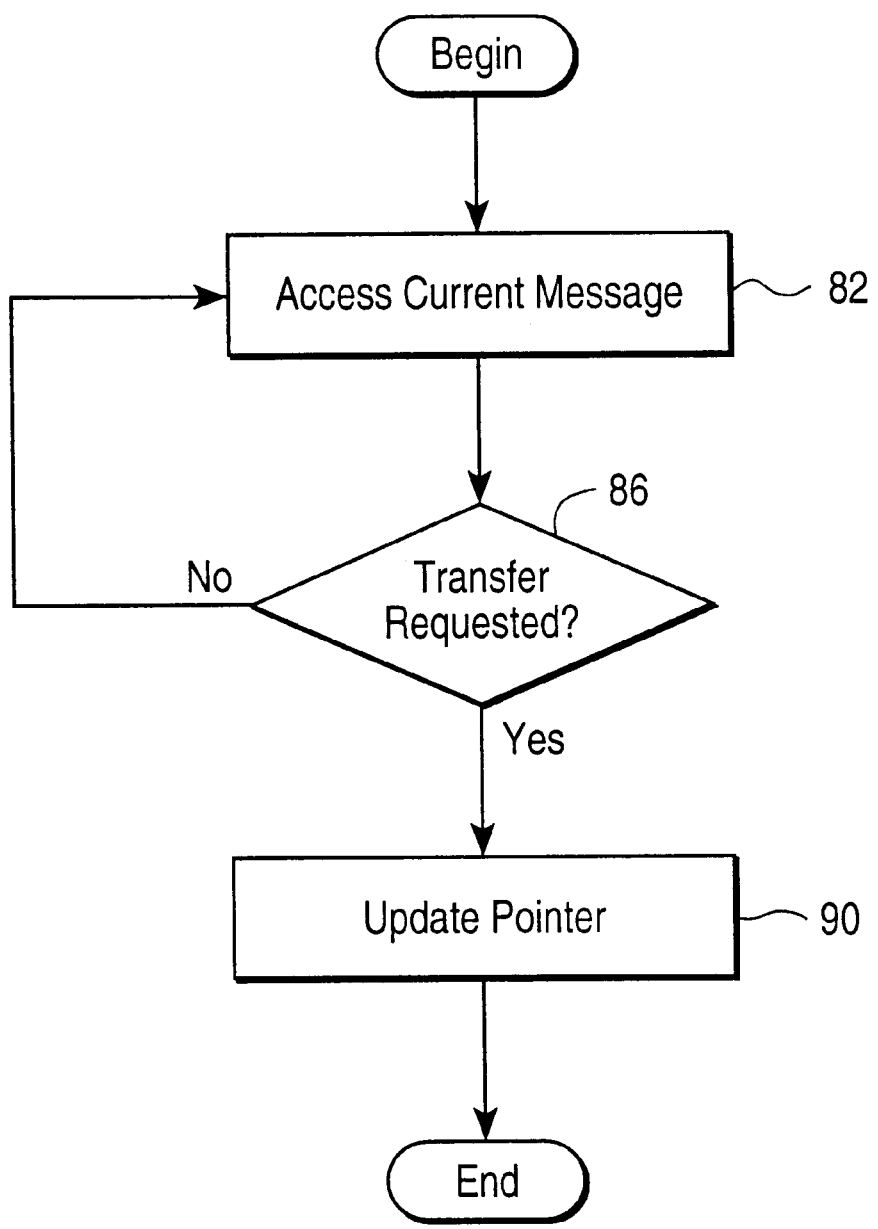
FIG. 4 illustrates a flow diagram of a method for updating a message pointer included in the systems shown in FIGS. 1 and 2.

FIG. 4 illustrates a flow diagram 80 of a method of updating the pointer 34. Initially, the pointer 34 indicates a current stored message that is accessible for playback (step 82). The processor 28 continuously monitors for a user transfer request (step 86). If a transfer request is detected, the call processor 28 updates the pointer 34 (step 90) to indicate the same and the procedure terminates.

The user can request a call transfer during playback by entering a predetermined pattern of keystrokes from a touch tone phone. The keystrokes may include the phone number of the other party to which the call is being transferred. In response to a transfer request, the call processor 28 not only updates the pointer 34, but also creates a re-call protocol element, prior to disconnecting the user from the VMS 20. The re-call protocol element is a data item that includes call identification information. The call identification information includes the user's mailbox ID and password, as well as a data element, or instruction, for causing the switch 22 to automatically reconnect the user call to the VMS 20 upon termination of the transferred call. To ensure confidentiality, the security unit 29 encrypts the mailbox password prior to its inclusion in the re-call protocol element. The re-call protocol element can also include call routing information, such as a phone number, permitting the switch 22 to automatically connect the transferred call to the terminal device of another party.

In a single user mailbox, the pointer 34 can be stored in the VMS 20. The pointer value can also be included in the re-call protocol element. This is useful in situations where the memory of the VMS 20 is limited. When the pointer value is included in the re-call protocol element, the switch 22 temporarily stores the value for the duration of the transferred call. When the call is terminated, the pointer is transferred back to the VMS 20, where it is read by the call processor 38 to access the indicated message in the queue.

Figure 5:
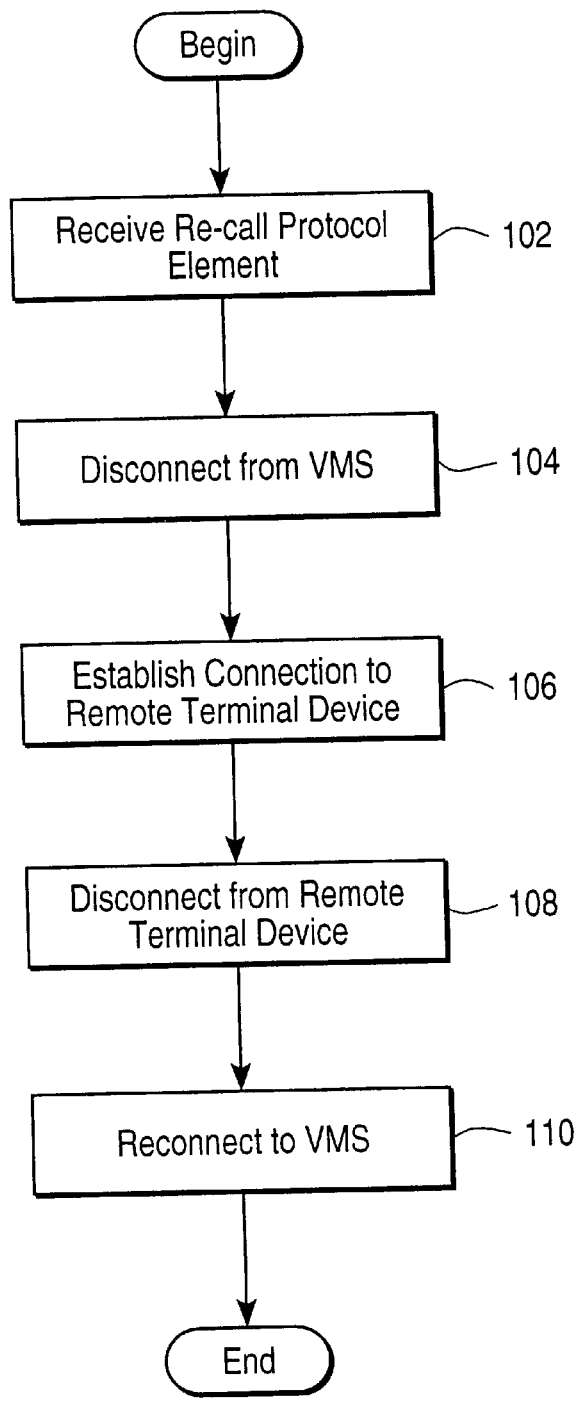
FIG. 5 illustrates a flow diagram of the operation of a telecommunications switch included in the systems shown in FIGS. 1 and 2.

FIG. 5 is a flow diagram 100 illustrating the operation of the switch 22. When the user requests a transfer to the remote terminal device 26, the call processor 28 transmits the re-call protocol element, which is received by the switch 22 (step 102). The switch 22 then disconnects the user call from the VMS 20 (step 104). In response to the re-call protocol element, the switch 22 establishes a communication path between the user terminal device 24 and the remote terminal device 26 (step 106). When the user has terminated the call to the remote terminal device 26, the switch 22 disconnects the remote terminal device 26 and automatically returns the user call to the VMS 20 (step 108). A transferred call can be terminated by either the user or the switch 22. For instance, the user can terminate the call to the remote terminal device 26 by depressing a FLASH key or a switch hook; while the switch can terminate the transferred call upon detecting a busy signal or line fault.

Upon reconnecting the user call to the VMS 20, the switch transfers the call identification information of the re-call protocol element to the call processor 28 (step 110). The call processor 28 identifies the incoming user call as a returned call and, in turn, causes the security unit 29 to decrypted the returned password. Upon verifying the mailbox ID and password, the call processor 28 automatically reconnects the user terminal device 24 to the corresponding mailbox 30. The call processor 28 then accesses the pointer 34 to automatically return the user to the next message in the message queue 32. This permits the user to return to the mailbox 30 without having to manually skip through any preceding messages.

The telecommunication switch 22 can be any device capable of responding to the re-call protocol element and providing switching and call setup services to the VMS 20 and the terminal devices 24–26. For example, the switch 22 can be a computerized branch exchange (CBX) or a private branch exchange (PBX), such as the HICOM 300E manufactured by Siemens Corporation, modified to include a software routine for switching calls based on the re-call protocol element. In this example, the re-call protocol element can be transferred between the VMS 20 and the switch 22 using a standard isochronous interface, or a dedicated industry standard signalling interface, such as S7.

The VMS 20 can be implemented using a microprocessor-based computer which includes one or more standard telecommunication cards for interfacing to the switch 22. For example, the VMS 20 can be based on a modified version of the PhoneMail™ VMS manufactured by Siemens Corporation. The call processor 28 and security unit 29 can be implemented as software routines running on the microprocessor. For example, the security unit 29 can be a conventional data encryption service (DES) software routine that encrypts mailbox passwords according to unique session keys generated each time a call is transferred. Program code for DES routines have been published and are readily available in the marketplace. To further enhance security, the passwords can be padded with extra bits before being encrypted. In addition to encrypting the mailbox password, the security unit 29 can also encrypt the mailbox ID.

The call processor 28 can include, among other things, routines for managing the interface with the switch 22, verifying mailbox IDs and passwords, responding to user commands (touch-tone signals) generating re-call protocol elements and accessing voice mailboxes and pointers for message recordation and playback.

The message queue 32 can be a data structure stored in a computer memory, such as a hard-disk drive, flash ROM, etc., and accessible by the call processor routine.

It will be readily apparent to one of ordinary skill in the art that the switch 22 typically includes circuitry for converting analog audio signals representing voice messages into digital data, such as pulse code modulated (PCM) voice data. The terminal devices 24–26 generally produce and respond to analog signals. The switch 22 can include a conventional CODEC for converting between the analog and PCM voice signals. The digital PCM voice signals produced by the switch can then be provided directly to the VMS 20. Alternatively, the VMS 20 can have a conventional analog interface port similar to that of a standard telephone. The switch 22 can include a CODEC and analog port for the VMS 20.

Figure 2:
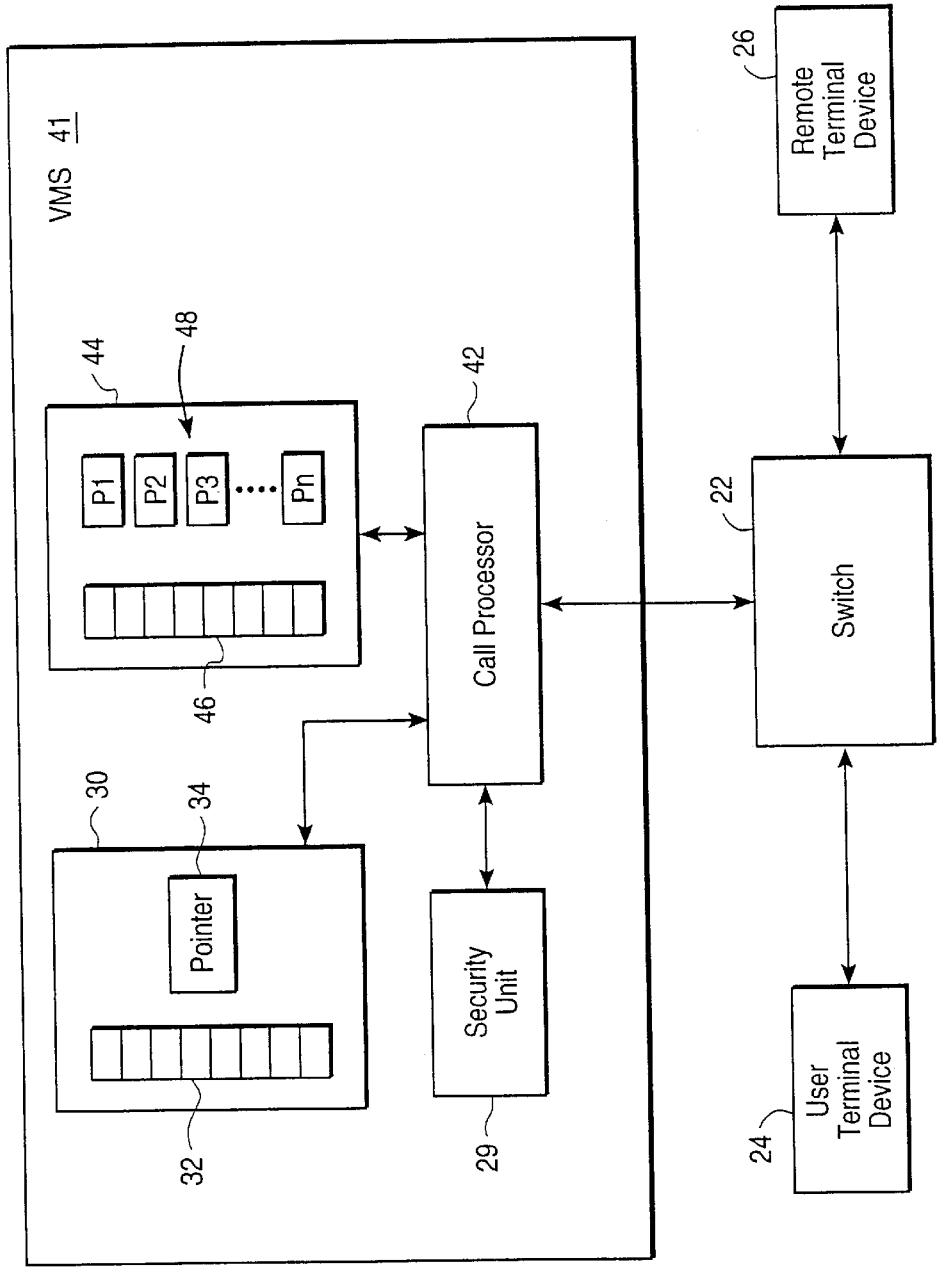
FIG. 2 illustrates a messaging system in accordance with another embodiment of the present invention.

Turning now to FIG. 2, there is illustrated a block diagram of a system 40 that includes a VMS 42 having a shared mailbox 44, as well as an individual mailbox 30. In addition to providing the functionality described with reference to FIG. 1, the call processor 42 permits the shared mailbox 44 to be accessed by multiple users. The shared mailbox 44 includes a single message queue 46 and a plurality of pointers 48. Each pointer corresponds to a different user. Multiple pointers permit the users to concurrently access the shared mailbox 44 and reliably use the call transfer feature described herein. The pointers 48 can be data variables accessible to a software routine included in the call processor 42. Each pointer can thus be independently incremented or decremented to indicate different locations in the respective message queue. The process shown in FIG. 4 can be used to update each individual pointer.

The call processor 42 allows the users to independently transfer in and out of the mailbox 44 without losing their places in the message queue 46. In order to permit multiple users to return to their respective positions, the call processor 42 includes one of the pointers in the re-call protocol element before it is transferred to the switch 22. This essentially creates a unique session identifier for accurately returning the individual user to where he left off in the message queue 46.

The security unit 29 is provided for encrypting the mailbox password. However, the security unit 29 can also encrypt the pointer before the call processor 42 transmits it to the switch 22. This enhances the security of the shared mailbox 44.

The call processor 42 generates a re-call protocol element in response to a user requested transfer during message playback. When the call processor 42 generates the re-call protocol element, it includes therein one of the pointers 48, as well as the mailbox ID and encrypted password. The call processor 42 then transmits the re-call protocol element to the switch 22, which in turn transfers the user's call to the remote terminal device 26. After the user has disconnected from the remote terminal device 26 and the switch 22 returns the call to the call processor 42, the call processor 42 uses the re-call protocol element to properly position the user within the message queue 46. By updating one of the pointers 48 with the return pointer included in the re-call protocol element, the shared mailbox 44 automatically returns the user to the appropriate next message in the queue 46.

Similarly to the system 10 of FIG. 1, the system 40 of FIG. 2 can include any number of single user or shared mailboxes, as well as any number of terminal devices.

Figure 3:
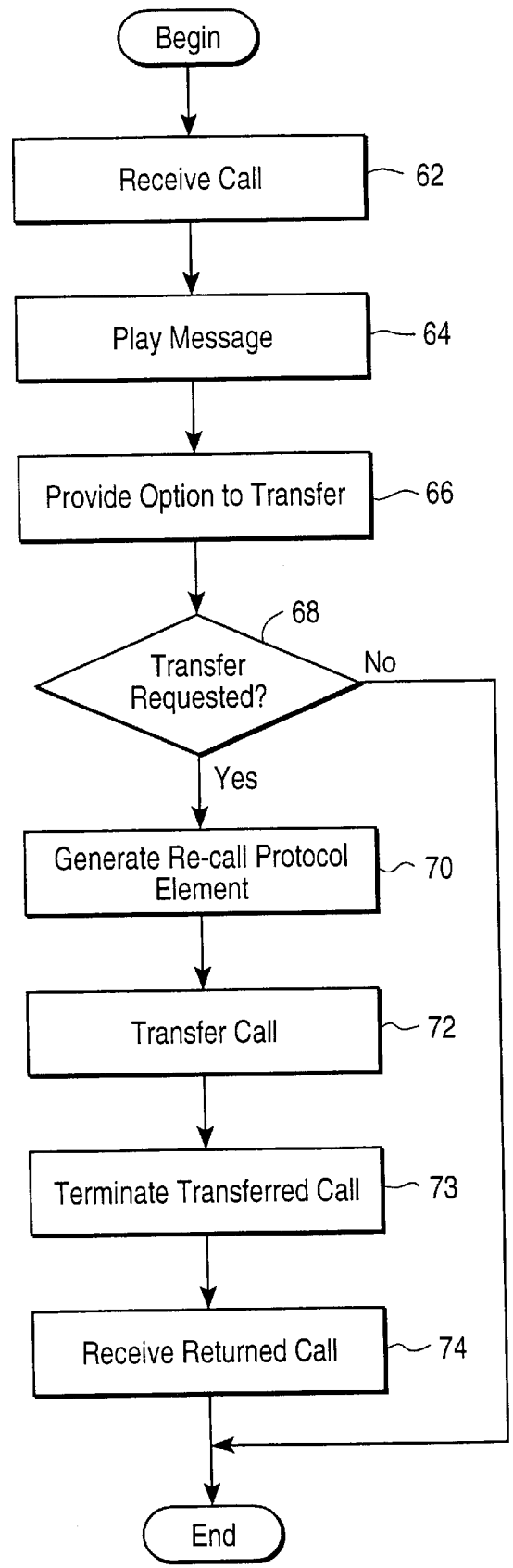
FIG. 3 illustrates a flow diagram of a method for automatically returning a transferred call to a predetermined position in a message queue, which is in accordance with a further embodiment of the present invention.

FIG. 3 illustrates a method 60 for automatically returning a user to a predetermined position in a message queue. In step 62, a call is received by the call processor 28, 42. The call is routed from the user terminal device 24 through the switch 22. After verifying the user's mailbox ID and password, the call processor 28, 42 permits the user to enter various commands. In response to a user command for message playback, call processor 28, 42 accesses the message queue 32, 46 of the user's respective mailbox 30, 44 and plays back the first message in the queue (step 64). During message playback, the call processor 28, 42 provides the user with the option to transfer the call to the remote terminal device 26 (step 66).

If the user opts to transfer the call, the method proceeds to step 70, otherwise, the method terminates (step 68). In step 70, the call processor 28, 42 generates the re-call protocol element. If the user is accessing the individual mailbox 30, the call processor 28, 42 includes the mailbox ID and encrypted password in the re-call protocol element. On the other hand, if the user is accessing the shared mailbox 44, the call processor 42 additionally includes a respective one of the pointers 48 in the re-call protocol element. The call processor 28, 42 then communicates with the switch 22 to transfer the call to the remote terminal device 26 (step 72).

In step 73, the call to the remote terminal device 26 is terminated by the user depressing a FLASH key or hanging up. The call can also be terminated when the switch 22 detects a busy signal or fault.

After the user or switch 22 terminates the call of the remote terminal device 26, the switch 22 automatically reconnects the call to the call processor 28, 42 (step 74). In response to the returned call, the call processor 28, 42 connects the user to the appropriate mailbox and returns to the queue position indicated by the pointer 34, 48.

What is claimed is:

1. A messaging system, comprising:
  means for playing a voice message in response to a call, wherein the voice message is stored in a message queue;
  means for identifying the position of the voice message in the queue;
  means for transferring the call to a terminal device as a result of playing the voice message, said transferring means operable to generate a re-call protocol element; and
  means for automatically returning the call to the position of the voice message upon disconnecting from the terminal device, said returning means including means for reading said re-call protocol element;
  wherein said re-call protocol element includes an instruction for directing said returning means to perform a return and is sent between said transferring means and said returning means.

2. The messaging system of claim 1, further comprising:
  means for providing an option to transfer the call during message playback.

3. The messaging system claim 1, further comprising:
  means for allowing multiple users to independently access the message queue.

4. The messaging system of claim 3, further comprising:
  means for identifying a respective queue position for each of the users.

5. A messaging system, comprising:
  a mailbox having a message queue capable of storing a sequence of voice messages;
  a pointer indicating a return position in the message queue;
  a call processor capable of transferring a call and generating a re-call protocol element in response to a user request received during message playback; and
  a telecommunications switch capable of re-connecting the transferred call to the call processor according to the re-call protocol element, the reconnected call accessing a voice message as a function of the pointer;

wherein said re-call protocol element includes an instruction for directing said telecommunications switch to perform a reconnection and is sent between said call processor and said telecommunications switch.

6. The messaging system of claim 5, wherein the re-connected call accesses the voice message stored at the return position indicated by the pointer.

7. The messaging system of claim 5, further comprising:

a security unit for encrypting the pointer.

8. The messaging system of claim 5, wherein the re-call protocol element includes the pointer.

9. The messaging system of claim 5, wherein the re-call protocol element includes a mailbox password.

10. The messaging system of claim 9, further comprising:

a security unit for encrypting the mailbox password.

11. The messaging system of claim 8, further comprising:

a shared mailbox having a shared message queue capable of storing a sequence of voice messages and being accessed by a plurality of users.

12. A messaging system, comprising:

a plurality of pointers, corresponding to the users, indicating one or more return positions in the shared message queue;

a call processor capable of transferring a call and generating a re-call protocol element in response to a user request received during message playback, the protocol element including one of the pointers; and a telecommunications switch capable of re-connecting the transferred call to the call processor according to the recall protocol element, the re-connected call accessing a voice message stored at the return position indicated by the pointer included in the re-call protocol element;

wherein said re-call protocol element includes an instruction for directing said telecommunications switch to perform a reconnection and is sent between said call processor and said telecommunications switch.

13. The messaging system of claim 11, further comprising:

a single-user mailbox having a message queue capable of storing a sequence of voice messages for an individual user.

14. The messaging system of claim 11, further comprising:

a security unit for encrypting a mailbox password.

15. The messaging system of claim 13, wherein the encrypted mailbox password is included in the protocol element.

16. A method of returning a call to a message queue stored in a voice mail system, comprising:

playing a voice message in response to the call, wherein the voice message is stored in the message queue;

identifying the position of the voice message in the queue;

transferring the call to a terminal device as a result of playing the voice message by disconnecting the call from the voice mail system and generating a re-call protocol element, wherein said re-call protocol element includes an instruction for directing a return and is sent from said voice mail system to a switch;

disconnecting the call from the terminal device; and re-connecting the call to the voice mail system and returning the call to the position of the voice message by reading said re-call protocol element and automatically skipping at least one message stored in at least one queue position preceding that of the voice message.

17. The method of claim 15, further comprising:

providing a caller with an option of transferring the call to the terminal device during message playback.

18. The method of claim 15, further comprising:

encrypting a pointer that indicates the position of the voice message in the queue.

19. The method of claim 15, wherein the message queue is accessible by multiple users.

20. A messaging system in accordance with claim 1, said re-call protocol element including call routing information.

21. A messaging system in accordance with claim 1, said re-call protocol element including a user identification and password.

22. A messaging system in accordance with claim 5, said re-call protocol element including call routing information.

23. A messaging system in accordance with claim 5, said re-call protocol element including a user identification and password.

24. A messaging system in accordance with claim 12, said re-call protocol element including call routing information.

25. A messaging system in accordance with claim 12, said re-call protocol element including a user identification and password.

26. A method in accordance with claim 16, said re-call protocol element including call routing information.

27. A method in accordance with claim 16, said re-call protocol element including a user identification and password.

* * * * *